United States Patent
Tsoukatos et al.

(10) Patent No.: US 10,210,899 B1
(45) Date of Patent: Feb. 19, 2019

(54) SKIP TRACK FLAW SCAN METHODS AND SYSTEMS

(71) Applicant: Seagate Technology LLC, Cupertino, CA (US)

(72) Inventors: Antonia Tsoukatos, Maple Grove, MN (US); Tim Rausch, Farmington, MN (US); Mehmet Fatih Erden, St. Louis Park, MN (US); Benjamin W Parish, Prior Lake, MN (US); Prasanna Manja Ramakrishna, Aurora, CO (US); John D Reinhardt, Berthoud, CO (US); Morovat Bryan Tayefeh, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/985,430

(22) Filed: May 21, 2018

(51) Int. Cl.
*G11B 27/36* (2006.01)
*G11B 20/18* (2006.01)
*G11B 5/596* (2006.01)
*G11B 20/12* (2006.01)
*G11B 5/455* (2006.01)

(52) U.S. Cl.
CPC ............ *G11B 20/182* (2013.01); *G11B 5/455* (2013.01); *G11B 5/59666* (2013.01); *G11B 20/1217* (2013.01); *G11B 2020/1826* (2013.01)

(58) Field of Classification Search
CPC .......... G11B 27/36; G11B 5/09; G11B 20/12; G11B 20/18; G11B 19/048; G11B 20/182; G11B 19/041; G11B 2020/1826
USPC .... 360/31, 48, 39, 53; 369/116, 53.1, 53.12, 369/53.15
See application file for complete search history.

(56) References Cited

U.S. PATENT DOCUMENTS

| | | | |
|---|---|---|---|
| 6,304,986 | B1 | 10/2001 | Ma et al. |
| 7,646,556 | B1 | 1/2010 | Kose et al. |
| 7,653,847 | B1 | 1/2010 | Liikanen et al. |
| 7,768,736 | B2 | 8/2010 | Belmont et al. |
| 8,599,507 | B2 | 12/2013 | Sanvido et al. |
| 8,964,320 | B1 | 2/2015 | Hu et al. |
| 9,142,246 | B1 | 9/2015 | Trantham et al. |
| 2010/0328800 | A1* | 12/2010 | Sakai ............... B82Y 10/00 360/31 |

* cited by examiner

*Primary Examiner* — Nabil Z Hindi
(74) *Attorney, Agent, or Firm* — Faegre Baker Daniels LLP

(57) ABSTRACT

A method for scanning for flaws on a magnetic recording medium is disclosed. The magnetic recording medium has a first set of nonconsecutive data tracks and a second set of nonconsecutive data tracks. The method includes writing a test pattern to only the first set of nonconsecutive data tracks of the magnetic recording medium, reading of the test pattern written to the first set of nonconsecutive data tracks, and identifying flaws within the first set of nonconsecutive data tracks and the second set of nonconsecutive data tracks based on the reading the test pattern.

20 Claims, 5 Drawing Sheets

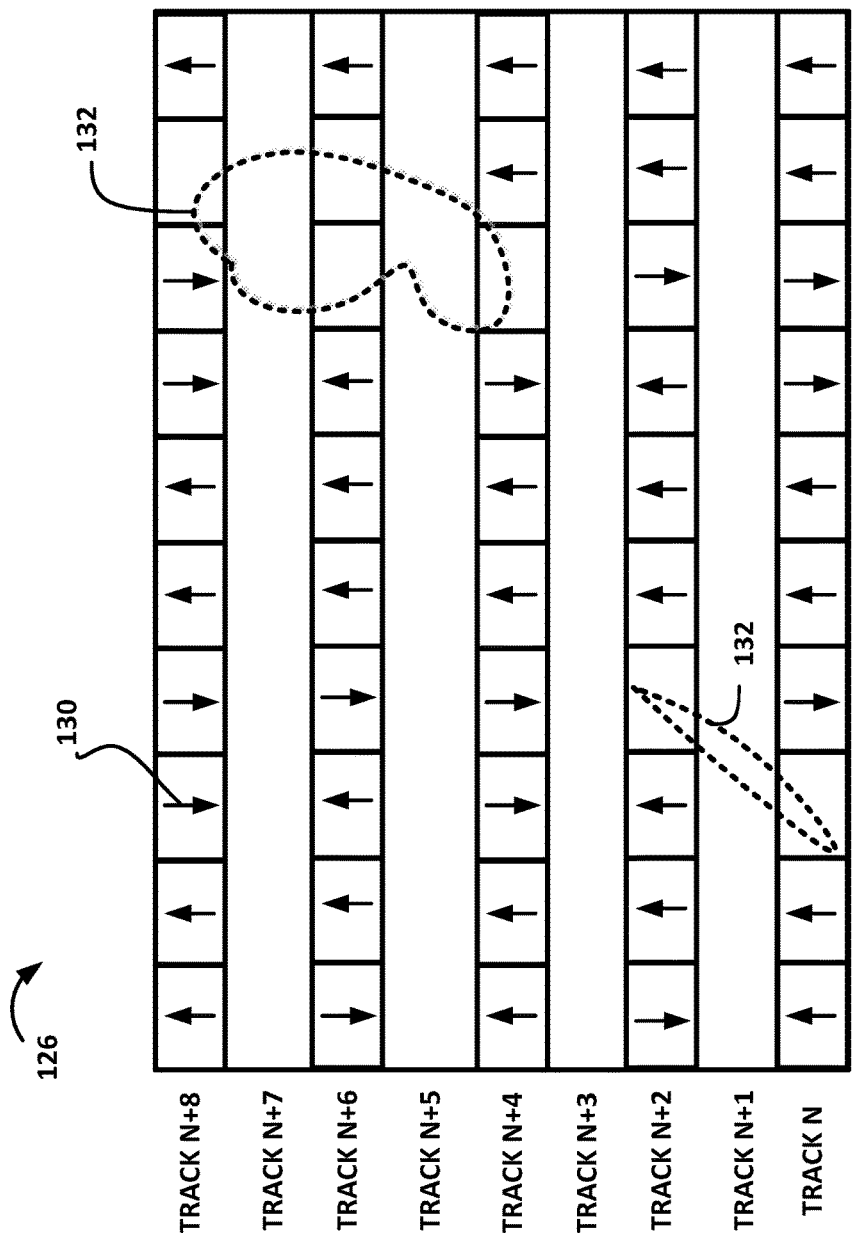

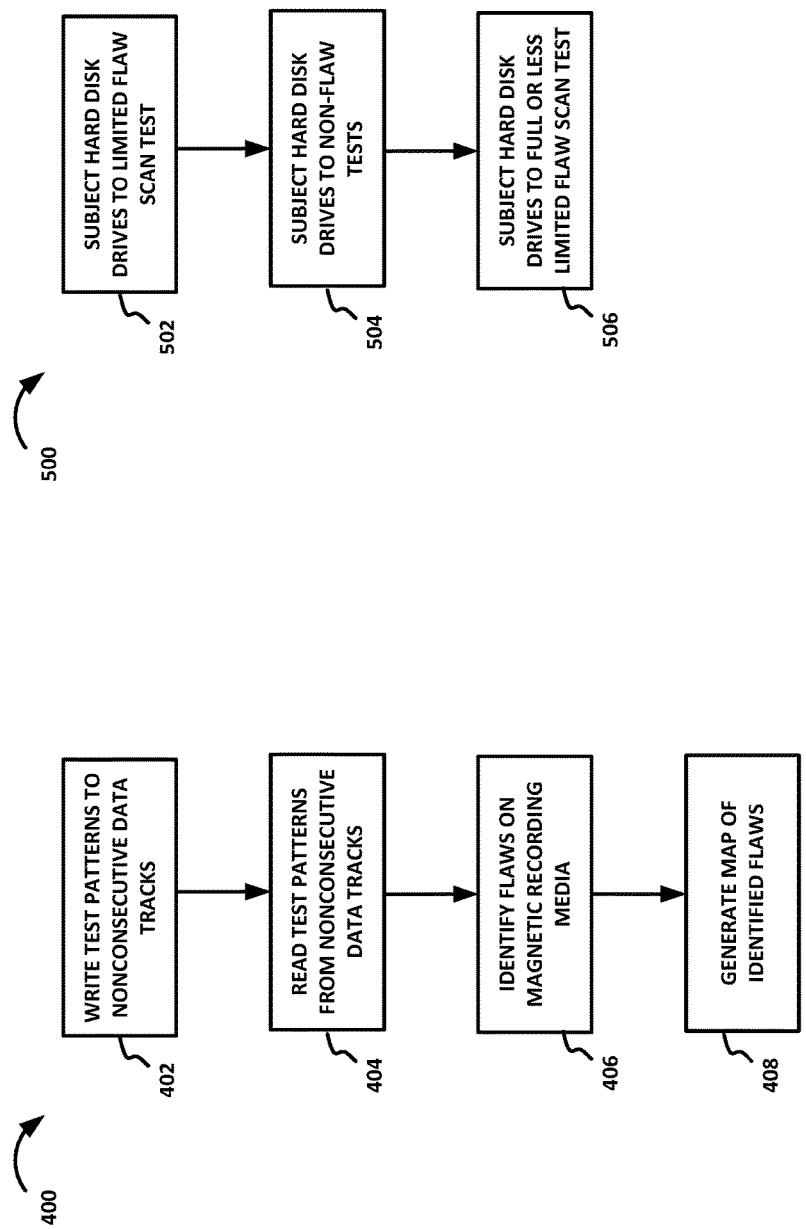

SKIP TRACK FLAW SCAN METHODS AND SYSTEMS

TECHNICAL FIELD

The present disclosure relates to manufacturing hard disk drives.

BACKGROUND

During manufacture of hard disk drives, data tracks on magnetic recording media are scanned for flaws. This involves writing magnetically polarized transitions along each of the data tracks and scanning for flaws by reading back the magnetically polarized transitions written to the data tracks.

SUMMARY

In certain embodiments, a method for scanning for flaws on a magnetic recording medium is disclosed. The magnetic recording medium has a first set of nonconsecutive data tracks and a second set of nonconsecutive data tracks. The method includes writing a test pattern to only the first set of nonconsecutive data tracks of the magnetic recording medium, reading of the test pattern written to the first set of nonconsecutive data tracks, and identifying flaws within the first set of nonconsecutive data tracks and the second set of nonconsecutive data tracks based on the reading the test pattern.

In certain embodiments, a testing system for scanning for flaws on magnetic recording media of hard disk drives is disclosed. The testing system includes a plurality of testing slots for receiving the hard disk drives and a controller configured to cause the testing system to implement a routine. The routine includes writing a test pattern to a plurality of non-consecutive tracks of the magnetic recording media of the hard disk drives without writing to the test pattern to tracks located intermediate the non-consecutive tracks on the magnetic recording media of the hard disk drives. The routine further includes reading of the test pattern written to the plurality of non-consecutive tracks and detecting flaws within the data tracks without the test pattern based on the reading the test pattern written to the plurality of non-consecutive tracks.

In certain embodiments, a method includes writing a test pattern to only nonconsecutive data tracks of a magnetic recording medium, reading of the test pattern, and generating a map of flaws on the magnetic recording medium based on the reading the test pattern.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 3 shows a schematic of data tracks of the magnetic recording medium of FIG. 2, in accordance with certain embodiments of the present disclosure.

FIGS. 4 and 5 show block representations of steps in methods for scanning for flaws on magnetic recording media, in accordance with certain embodiments of the present disclosure.

Figure 1:
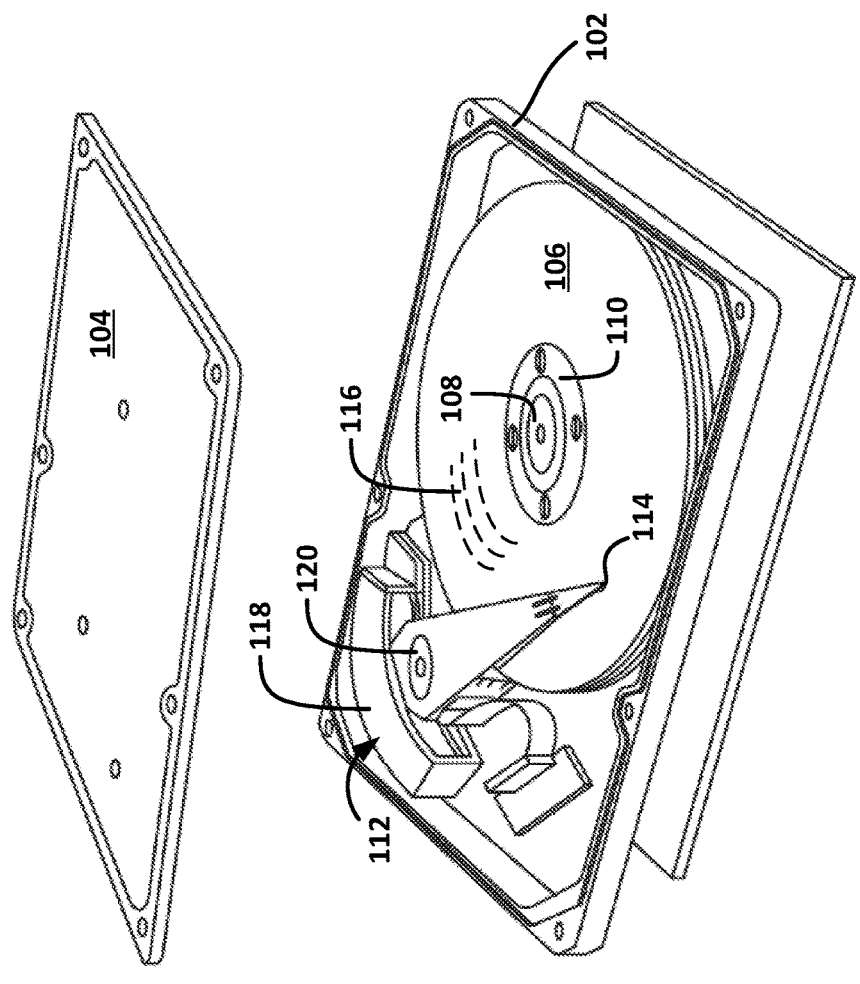
FIG. 1 shows an exploded view of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

To meet the increasing demand for digital storage, hard disk drives continue to increase in areal density. Increased areal density typically involves—among other things—increasing the number of tracks on a hard disk drive's magnetic recording media. Increasing the number of tracks involves reducing the size of the tracks to allow for more tracks in a given area, and decreased track sizes lead to smaller tolerances for error. As a result, the time and cost for manufacturing hard disk drives continues to increase. For example, increasing the number of tracks on magnetic recording media increases the time required to scan for and identify potential flaws along the tracks. Certain embodiments of the present disclosure relate to approaches for identifying flaws on magnetic recording media used in hard disk drives.

FIG. 1 shows an exploded, perspective view of a hard disk drive 100 having a base deck 102 and top cover 104 that house various components of the hard disk drive 100. The hard disk drive 100 includes magnetic recording media 106 (individually referred to as a magnetic recording medium) coupled to a spindle motor 108 by a disk clamp 110. The hard disk drive 100 also includes an actuator assembly 112 that positions read/write heads 114 over data tracks 116 on the magnetic recording media 106. During operation, the spindle motor 108 rotates the magnetic recording media 106 while the actuator assembly 112 is driven by a voice coil motor assembly 118 to pivot around a pivot bearing 120. The read/write heads 114 write data to the magnetic recording media 106 by generating and emitting a magnetic field towards the magnetic recording media 106 which induces magnetically polarized transitions on the desired data track 116. The magnetically polarized transitions are representative of the data. The read/write heads 114 sense (or "read") the magnetically polarized transitions with a magnetic transducer. As the magnetic recording media 106 rotates adjacent the magnetic transducer, the magnetically polarized transitions induce a varying magnetic field into the magnetic transducer. The magnetic transducer converts the varying magnetic field into a read signal that is delivered to a preamplifier and then to a read channel for processing. The read channel converts the read signal into a digital signal that is processed and then provided to a host system (e.g., server, laptop computer, desktop computer).

During manufacture of hard disk drives 100, magnetic recording media 106 are subjected to tests that scan for potential flaws that would likely cause errors when writing data to or reading data from the magnetic recording media 106. These tests are sometimes referred to as flaw scan tests. Flaw scan tests can be performed while the hard disk drives 100 are positioned in a testing system (described in more detail with respect to FIG. 6) that houses and simultaneously tests hundreds of hard disk drives 100. Example flaws identified during flaw scan tests include physical divots (e.g., scratches) or material buildup along the surfaces of the magnetic recording media 106. These flaws make it difficult to write data to or read data from affected areas of the magnetic recording media 106 and/or can damage to the read/write heads 114.

Typically, a flaw scan test involves writing test patterns to each of the data tracks 116 (e.g., writing to sequential data tracks) and then reading the test patterns from each of the data tracks 116 using a read/write head 114. An example test pattern is a square wave pattern with a particular duty cycle. The read signal generated by the read/write head 114 in response to reading such a test pattern is a sinusoidal-like read signal. Errors in the read signal, which are identified during an analysis of the read signal, indicate flaws in the magnetic recording media 106. For example, a read signal generated by the read/write head 114 may include disruptions (e.g., less-than-expected amplitude, spikes in amplitude) indicative of flaws. In another example, as the read channel converts the read signal into a digital signal, the read channel may identify errors indicative of flaws within particular data tracks. Areas of the magnetic recording media 106 identified as containing flaws (and the location of such areas) are recorded in a flaw map. Flaw maps are referred to during operation of the hard disk drive 100 so that data is not written to the areas mapped as containing flaws.

In certain embodiments, if a magnetic recording medium 106 contains too many flaws on one of its surfaces (e.g., an unacceptable total area containing flaws or an unacceptable total number of flaws), the magnetic recording medium 106 is scrapped and the hard disk drive 100 will be reworked (e.g., reprocessed with one or more replacement magnetic recording media 106). Reworking a hard disk drive 100 requires additional processing and testing time which adds to the overall time and cost to manufacture the hard disk drive 100.

As discussed above, as more data tracks are used in a given area of a magnetic recording medium 106 (so that more user data can be stored in that area), flaw scan tests take longer to complete, which increases the time and cost to manufacture hard disk drives 100.

Certain embodiments of the present disclosure are accordingly directed to techniques for decreasing the time required to perform flaw scan tests. In certain embodiments, flaw scan tests are performed by skipping data tracks when both writing test patterns to and reading test patterns from the magnetic recording media 106. The inventors of the present disclosure have found that most flaws span across multiple tracks. As such, the flaw scan test can write test patterns to and read test patterns from fewer tracks (i.e., can skip tracks) while still identifying most flaws that would be identified when writing test patterns to and reading test patterns from consecutive tracks.

Figure 2:
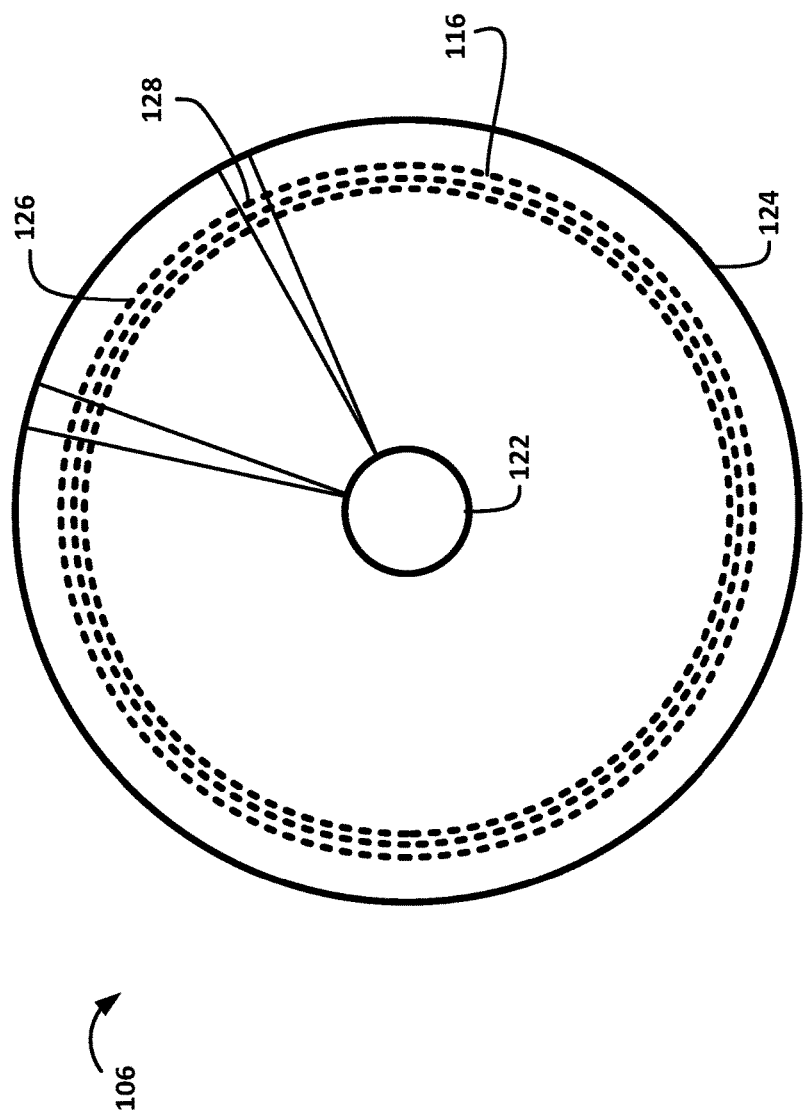
FIG. 2 shows a top view of a magnetic recording medium, in accordance with certain embodiments of the present disclosure.

FIG. 2 shows a top view of a magnetic recording medium 106. The magnetic recording medium 106 is donut-shaped and includes an inner boundary 122, which is to be coupled to a spindle motor, and an outer boundary 124. The magnetic recording medium 106 includes data tracks 116 for data storage between the inner boundary 122 and the outer boundary 124. For simplicity, only a few data tracks 116 are shown in FIG. 2. Each of the data tracks 116 includes data sectors 126 for storing user data and includes servo sectors 128 (sometimes referred to as servo wedges) for storing servo information. Servo information facilitates the read/write head 114 seeking and following data tracks 116 on the magnetic recording media 106.

FIG. 3 shows example data sectors 126 of nine data tracks (i.e., track N through track N+8) of the magnetic recording medium 106. FIG. 4 shows a block representation of steps in a method 400 for scanning for flaws on the magnetic recording medium 106.

The data tracks in FIG. 3 include a first set of nonconsecutive data tracks (i.e., track N, N+2, N+4, N+6, and N+8) and a second set of nonconsecutive data tracks (i.e., track N+1, N+3, N+5, and N+7). In certain embodiments, the first set of nonconsecutive data tracks are even-numbered data tracks, and the second set of nonconsecutive data tracks are odd-numbered data tracks. In certain embodiments, the first set of nonconsecutive data tracks are odd-numbered data tracks, and the second set of nonconsecutive data tracks are even-numbered data tracks. Regardless, as shown in FIG. 3, the first set of nonconsecutive data tracks and the second set of nonconsecutive data tracks are interspersed with each other such that individual data tracks from the first set are positioned between data tracks from the second set.

Using the data tracks as arranged in FIG. 3 as an example, the first set of nonconsecutive data tracks (i.e., track N, N+2, N+4, N+6, and N+8) each include magnetically polarized transitions 130, which are represented by arrows within the data tracks. These magnetic transitions represent a test pattern that has been written to such nonconsecutive data tracks (step 402 in FIG. 4). As shown in FIG. 3, the second set of nonconsecutive data tracks (i.e., track N+1, N+3, N+5, and N+7) do not include magnetically polarized transitions 130. Writing test patterns to only a subset of data tracks (e.g., every other data track) of the magnetic recording medium 106 reduces the time required to carry out flaw scan tests compared to tests that write test patterns to all data tracks or to consecutive data tracks. As discussed above, most flaws span across multiple data tracks, so writing testing patterns to fewer tracks will still allow identification of most flaws that would have been identified when writing test patterns to all data tracks.

In certain embodiments, the tracks with test patterns are spaced apart by more than one track (e.g., one to ten tracks). In such embodiments, the tracks without test patterns would be consecutive while the tracks with the test patterns would be nonconsecutive. Using the tracks of FIG. 3 as an example, instead of writing test patterns to track N+2 and track N+6, those tracks could be left without test patterns. As such, the tracks with test patterns (i.e., tracks N, N+4, and N+8) would be interspersed between sets of consecutive tracks without test patterns (i.e., tracks N+1, N+2, N+3, N+5, N+6, and N+7).

After writing the test patterns to the first set of nonconsecutive data tracks, the test patterns can be read (step 404 in FIG. 4) by a read/write head 114, which generates a read signal that is convert to a digital read signal by a read channel. In certain embodiments, the generated read signal is a sinusoidal-like signal.

After reading the test patterns to the first set of nonconsecutive data tracks, the flaws 132 on the magnetic recording medium 106 can be identified (step 406 in FIG. 4). The flaws 132 are identified as spanning along both the first and second set of nonconsecutive data tracks, so the disclosed method 400 can identify flaws on all data tracks while only writing test patterns to and reading test patterns from nonconsecutive data tracks. In certain embodiments, flaws on the second set of nonconsecutive data tracks are identified without requiring extra steps to confirm the existence of the flaw on such data tracks. For example, in certain embodiments, no steps are taken to confirm—after identifying the potential existence of a flaw—that a flaw exists by writing to and reading from a data track within the second set.

Flaws are identified by analyzing the read signal. For example, a read signal generated by the read/write head 114 may include disruptions indicative of flaws or, as the read channel converts the read signal into a digital signal, the read channel may identify errors indicative of flaws within particular data tracks. FIG. 3 shows a few example flaws 132 at locations where no magnetically polarized transitions 130 were recorded. The lack of magnetically polarized transitions 130 at locations expected to have transitions may be the result of a physical divot (e.g., scratch) along the surface of the magnetic recording medium 106. The lack of magnetically polarized transitions 130 may be detected when analyzing the read signal, and a flaw may be identified to exist at such locations in response to detecting the lack of magnetically polarized transitions 130.

As flaws are identified, the size and location of the identified flaws can be recorded (e.g., mapped) (step 408 in FIG. 4). For example, upon identifying a flaw, a range of angles and radii on the magnetic recording medium 106 associated with the identified flaw can be recorded. The identified flaws are recorded to what may be referred to as a flaw map. The flaw map is a list of identified flaws and their size and location on the magnetic recording media 106. In certain embodiments, the size of the identified flaws is padded such that areas around the identified flaws are recorded to the flaw map. For example, in FIG. 3, the size of the flaw 132 that extends along tracks N through N+2 may be padded such that in the flaw map identifies the flaw 132 as covering more than just tracks N through N+2. The flaw map is stored to firmware within hard disk drives 100 and used during operation of the hard disk drive 100 so that data is not written to the areas mapped as containing flaws.

After or while identifying the flaws, the number of flaws and/or total areas consumed by flaws can be compared to various thresholds to determine whether the hard disk drive 100 should be reworked or whether the hard disk drive 100 should be graded for a different storage capacity. For example, if the number of flaws or total area containing flaws on a surface of the magnetic recording media 106 exceeds a maximum threshold of acceptable flaws or area, then the hard disk drive 100 may be designated as "to be reworked," in which the flawed magnetic recording media 106 is replaced with new magnetic recording media 106 and the hard disk drive 100 repeats certain processing and testing steps. In another example, the number of flaws or total area containing flaws on a surface of the magnetic recording media 106 may not exceed a maximum threshold of acceptable flaws or area but instead may cause the hard disk drive 100 to be downgraded to a lower capacity than initially intended.

In certain embodiments, before the hard disk drive 100 is completely manufactured, the hard disk drive 100 may ultimately be subjected to a flaw scan test that writes test patterns to and reads data from consecutive data tracks. For example, even if the hard disk drive 100 is first subjected to a flaw scan test utilizing the steps of the method 400 described above, the hard disk drive 100 may later be subjected to a flaw scan test involving writing and reading test patterns on consecutive data tracks. In certain embodiments, the hard disk drive 100 is subjected to a variety of processes and tests between the more limited flaw scan test and the full flaw scan test. The more limited flaw scan test described above can be used—earlier in the manufacturing process—to identify magnetic recording media 106 that contain too many flaws on one or both of its surfaces. As mentioned above, magnetic recording media 106 with too many flaws may be scrapped, and the hard disk drive 100 will be reworked. Reworking a hard disk drive 100 requires repeating processes and tests the hard disk drive 100 had already been subjected to before the flaw scan test. Early identification of hard disk drives 100 needing to be reworked, via the limited flaw scan test, saves time from having to subject and re-subject the hard disk drive 100 to processes and tests carried out before the full flaw scan test is performed later in the manufacturing process.

FIG. 5 shows a block representation of steps in a method 500 for saving overall hard disk drive manufacturing time using the limited flaw scan test outlined by FIG. 4 while still subjecting hard disk drives 100 to a full flaw scan test. Step 502 of the method 500 includes subjecting hard disk drives 100 to the limited flaw scan test outlined by FIG. 4. Step 504 includes subjecting the hard disk drives 100 to a plurality of non-flaw-scan tests. For example, the hard disk drives 100 may subjected to tests that establish fly-height parameters, establish read/write channel parameters, tune write power parameters, characterize bit-error rates, and characterize adjacent track interference values of the hard disk drives 100. Step 506 includes subjecting the hard disk drives 100 to a full flaw scan test or a less limited flaw scan test. For example, in a less limited flaw scan test, data tracks identified to have large flaws or many flaws can be scanned at a finer resolution. In such examples, test patterns can be written to and read from consecutive data tracks identified to have flaws. Further, the data tracks with the largest flaws or largest number of flaws can be scanned before data tracks with smaller or fewer flaws. In certain embodiments, the later flaw scan test is carried out while the hard disk drives 100 are being processed in non-flaw-scan tests. In certain embodiments, the later flaw scan test is carried out while the hard disk drives 100 are "in the field" (e.g., during idle periods after installation in a server, desktop, etc.). During or after the subsequent flaw scan test, the flaw scan map can be updated with additional information about flaws identified during such subsequent tests.

Figure 6:
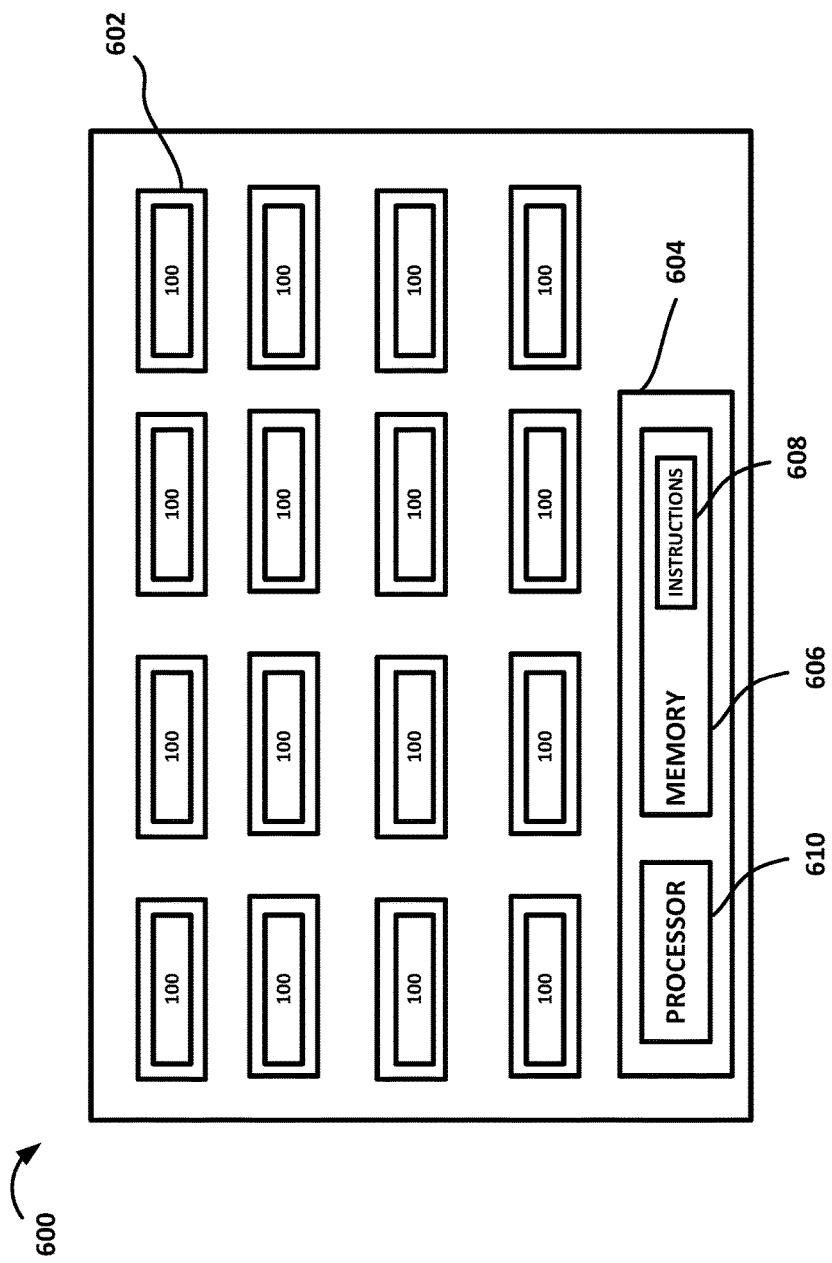
FIG. 6 shows a schematic of a testing machine, in accordance with certain embodiments of the present disclosure.

FIG. 6 shows a testing system 600 that includes a plurality of testing slots 602. The testing slots 602 may be sized such that a hard disk drive 100 can be positioned in each of the testing slots 602. While the hard disk drives 100 are positioned in the testing slots 602, the testing system 600 can subject the hard disk drives 100 to the flaw scan tests described above. For example, the testing system 600 can include components that assist with carrying out the above-described flaw scan tests. The testing system 600 can include one or more controllers 604 implemented using firmware, integrated circuits, and/or software modules that interact with each other or are combined together. For example, the controllers 604 may include memory 606 storing computer-readable instructions/code 608 for execution by one or more processors 610 (e.g., microprocessor)—and therefore the testing system 600—to perform aspects of the methods discussed herein. The computer-executable instructions 608 may include, for example, computer code, machine-useable instructions, and the like such as, for example, program components capable of being executed by the one or more processors 610.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method for scanning for flaws on a magnetic recording medium having a first set of nonconsecutive data tracks and a second set of nonconsecutive data tracks, the method comprising:
    writing a test pattern to only the first set of nonconsecutive data tracks of the magnetic recording medium;
    reading of the test pattern written to the first set of nonconsecutive data tracks; and
    identifying flaws within the first set of nonconsecutive data tracks and the second set of nonconsecutive data tracks based on the reading the test pattern.

2. The method of claim 1, wherein the first set of nonconsecutive data tracks and the second set of nonconsecutive data tracks are interspersed with each other such that an individual data track from the first set of nonconsecutive data tracks is positioned between two data tracks from the second set of nonconsecutive data tracks.

3. The method of claim 1, wherein the reading the test pattern includes generating a read signal, and wherein identifying flaws within the first set of nonconsecutive data tracks and the second set of nonconsecutive data tracks based on the reading of the test pattern includes analyzing the generated read signal to identify anomalies in the read signal.

4. The method of claim 1, further comprising:
    generating a map of the identified flaws of the magnetic recording medium.

5. The method of claim 4, wherein the step of generating the map includes determining a size of the identified flaws.

6. The method of claim 5, further comprising determining a location of the identified flaws.

7. The method of claim 4, wherein the map is stored to firmware within a hard disk drive.

8. The method of claim 1, wherein the first set of nonconsecutive data tracks includes even-numbered data tracks, and wherein the second set of nonconsecutive data tracks includes odd-numbered data tracks.

9. The method of claim 1, wherein the first set of nonconsecutive data tracks include odd-numbered data tracks, and wherein the second set of nonconsecutive data tracks include even-numbered data tracks.

10. The method of claim 1, further comprising:
    comparing the identified flaws to a predetermined threshold;
    reworking hard disk drives associated with magnetic recording media exceeding the predetermined threshold; and
    subjecting hard disk drives associated with magnetic recording media not exceeding the predetermined threshold to further tests.

11. The method of claim 10, further comprising: additional steps performed after subjecting the hard disk drives to the further test, the additional steps comprising:
    writing a test pattern to both the first and second sets of nonconsecutive data tracks,
    reading of the test pattern written to both the first and second sets of nonconsecutive data tracks, and
    further identifying flaws within both the first and second sets of nonconsecutive data tracks based on the reading the test pattern.

12. The method of claim 1, wherein the data tracks includes data sectors and servo sectors.

13. A testing system for scanning for flaws on magnetic recording media of hard disk drives, the testing system comprising:
    a plurality of testing slots for receiving the hard disk drives; and
    a controller configured to cause the testing system to implement a routine of:
        writing a test pattern to a plurality of non-consecutive tracks of the magnetic recording media of the hard disk drives without writing the test pattern to tracks located intermediate the non-consecutive tracks on the magnetic recording media of the hard disk drives,
        reading the test pattern written to the plurality of non-consecutive tracks, and
        detecting flaws within the tracks without the test pattern based on the reading the test pattern written to the plurality of non-consecutive tracks.

14. The testing system of claim 13, wherein each of the tracks without the test pattern are located adjacent at least one of the plurality of non-consecutive tracks.

15. The testing system of claim 13, wherein the controller is configured to cause the testing system to implement a routine of generating a map of the detected flaws of the magnetic recording medium.

16. The testing system of claim 15, wherein the map includes a location of each of the detected flaws.

17. The testing system of claim 15, wherein the controller is configured to cause the testing system to implement a routine of storing the generated map to firmware in each of the hard disk drives.

18. A method comprising:
    writing a test pattern to only nonconsecutive data tracks of a magnetic recording medium;
    reading of the test pattern; and
    generating a map of flaws on the magnetic recording medium based on the reading the test pattern.

19. The method of claim 18, wherein the magnetic recording medium includes a plurality of tracks without a test pattern positioned between the nonconsecutive data tracks with the test pattern.

20. The method of claim 18, wherein the magnetic recording medium includes a single track without a test pattern positioned between the nonconsecutive data tracks with the test pattern.

* * * * *